(12) United States Patent
Cai

(10) Patent No.: US 6,767,071 B2
(45) Date of Patent: Jul. 27, 2004

(54) LIGHTWEIGHT SPINDLE

(75) Inventor: Haimian Cai, Ann Arbor, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/950,197

(22) Filed: Sep. 10, 2001

(65) Prior Publication Data
US 2003/0047989 A1 Mar. 13, 2003

(51) Int. Cl.⁷ .............................................. B60B 35/00
(52) U.S. Cl. .................... 301/132; 301/124.1; 29/515; 228/2.3
(58) Field of Search .............................. 301/124.1, 125, 301/126, 131, 132, 137; 411/180, 179, 181; 29/515, 516; 228/2.3

(56) References Cited

U.S. PATENT DOCUMENTS

| | | | | | |
|---|---|---|---|---|---|
| 1,946,065 | A | * | 2/1934 | Dodge | 285/39 |
| 2,238,488 | A | * | 4/1941 | Foskett | 52/513 |
| 2,347,219 | A | * | 4/1944 | Schnell | 188/206 A |
| 3,186,284 | A | * | 6/1965 | Bennett | 83/623 |
| 3,311,148 | A | * | 3/1967 | Leitner | 411/180 |
| 3,980,248 | A | * | 9/1976 | Minoshima | 242/118.7 |
| 4,080,003 | A | * | 3/1978 | Boughton | 301/125 |
| 4,127,306 | A | * | 11/1978 | Foster | 301/127 |
| 4,768,839 | A | * | 9/1988 | Spindler | 301/124.1 |
| 4,919,491 | A | * | 4/1990 | Heideman | 301/126 |
| 5,626,450 | A | * | 5/1997 | Ferrari et al. | 411/510 |
| 5,752,725 | A | * | 5/1998 | El-Sobky | 285/21.1 |
| 5,868,409 | A | | 2/1999 | Breuer | 280/93 |
| 6,000,763 | A | * | 12/1999 | Stevens | 301/108.5 |
| 6,059,378 | A | * | 5/2000 | Dougherty et al. | 301/124.1 |
| 6,174,117 | B1 | * | 1/2001 | Kawatani et al. | 411/107 |
| 6,299,258 | B1 | * | 10/2001 | Wright et al. | 301/124.1 |
| 6,565,159 | B1 | * | 5/2003 | Kosak | 301/132 |

FOREIGN PATENT DOCUMENTS

| | | |
|---|---|---|
| DE | 19519576 A1 | 12/1996 |
| DE | 19917071 A1 | 10/2000 |
| EP | 0818269 A1 | 1/1998 |
| GB | 2091153 A | 7/1982 |

OTHER PUBLICATIONS

European Search Report issued on Dec. 30, 2002 for European application No. 02252452.2, pp. 1–4.

* cited by examiner

Primary Examiner—Russell D. Stormer
(74) Attorney, Agent, or Firm—Brinks Hofer Gilson & Lione

(57) ABSTRACT

A spindle for use in an automobile chassis is provided. An aluminum knuckle with an axial through hole defined in its interior is provided along with a substantially cylindrical steel stem with an interlocking feature defined on one end. The interlocking feature has an extended flange with an outer diameter greater than the inner diameter of the through hole in the knuckle. The interlocking feature also has a frusto-conical section and at least a portion of the stem is welded to at least a portion of the through hole such that the interlocking feature is within the through hole.

22 Claims, 4 Drawing Sheets

LIGHTWEIGHT SPINDLE

FIELD OF THE INVENTION

The invention relates generally to the field of automotive chassis. In particular, the invention relates to a lightweight spindle for use in automotive vehicles.

DESCRIPTION OF THE RELATED ART

Metal spindles are utilized in automotive vehicles to support the wheel bearing and provide a connection of the wheel bearing to the chassis. Modern spindles are commonly manufactured from high-strength steel and are constructed from two pieces, the stem and the knuckle.

The stem of a spindle is commonly a cylindrical piece made from high-strength steel. The stem provides a mounting point for the wheel of a vehicle, and the stem connects to a knuckle, which is connected by rods to the chassis of the vehicle. The usual connection point between the stem and the knuckle is an opening defined in the knuckle.

The knuckle of a spindle is also constructed of a high-strength steel and connects the spindle to the chassis of the vehicle. The knuckle has an opening defined in it to provide a connection point for the stem of the spindle.

There are varying methods of providing a reliable connection between the stem and the knuckle of the spindle. One method is to construct the stem so that the outer diameter of the stem is slightly larger than the inner diameter of the opening defined in the knuckle of the spindle. The stem is then mechanically pushed into the opening in the knuckle. This method requires the use of high-strength steel in both the stem and the knuckle to prevent deformation of either piece.

Another method also utilizes a stem with an outer diameter slightly greater than the inner diameter of an opening in the knuckle, but connects the two pieces in a different manner. In this method, the opening in the knuckle is heated until it is enlarged, and then the stem is mechanically pushed into the opening. Again, high-strength steel is required for both pieces.

The use of high-strength steel creates a strong supporting spindle and reduces harmful deformation, but at the cost of adding extra weight to the vehicle. It is desirable to construct a spindle that provides a comparable amount of support, yet is also as lightweight as possible.

BRIEF SUMMARY OF THE INVENTION

In one embodiment of the present invention, a spindle for use in an automobile chassis is provided. An aluminum knuckle with an axial through hole defined in its interior is provided along with a substantially cylindrical steel stem with an interlocking feature defined on one end. The interlocking feature has an extended flange with an outer diameter greater than the inner diameter of the through hole in the knuckle. The interlocking feature also has a frusto-conical section and at least a portion of the stem is welded to at least a portion of the through hole such that the interlocking feature is within the through hole.

In a second embodiment of the present invention, a spindle for use in an automobile chassis is provided. An aluminum knuckle with an axial opening defined in it and a substantially cylindrical steel stem are provided. The stem has an interlocking feature defined on one end and the interlocking feature is friction-welded into the axial opening of the knuckle.

In yet another embodiment of the present invention, a method of forming a spindle for use in an automobile is provided. The method comprises the first step of providing an aluminum knuckle and defining an axial through hole in it. The next step is to provide a substantially cylindrical steel stem with an interlocking feature defined on one end and align the stem with the through hole. A rotational force is applied to the stem and axial pressure is applied to the stem to mount the interlocking feature into the through hole.

DETAILED DESCRIPTION OF THE PREFERRED EMBODIMENTS OF THE INVENTION

Figure 5:
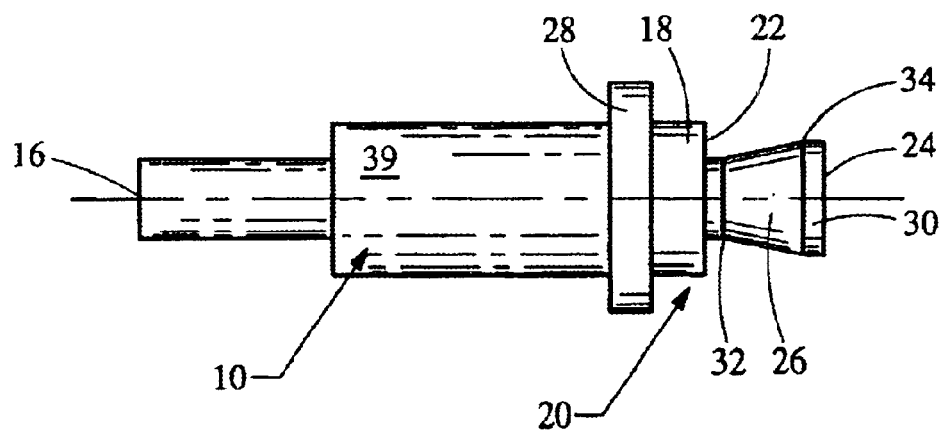
FIG. 5 is a side view of the stem of FIG. 1.

Referring in to FIGS. 1A, 1B, 1C and 1D, the preferred steps of the method of the present invention are shown. The steps are shown utilizing one embodiment of the stem 10, also shown in FIG. 5. A steel stem 10 is provided along with an aluminum knuckle 12. An axial through hole 14 is defined in the knuckle 12. The through hole 14 is preferably round as shown, but could take alternative shapes.

The stem 10 has a first end 16 and a second end 18. An interlocking feature 20 is defined on the second end 18 of the stem 10. The interlocking feature 20 is a specifically contoured section of the stem 10 that is inserted into the through hole 14 of the knuckle 12. The specific contours of the interlocking feature 20 facilitate the movement of softened aluminum from the knuckle 12 into the open areas between the interlocking feature 20 and the interior of the through hole 14 during the friction-welding process, as described below. A wheel (not shown) is normally mounted on the first end 16 of the stem 10. The interlocking feature 20 has a first end 22 and a second end 24. In the embodiment shown in FIGS. 1A, 1B, 1C, 2A, 2B, 2C, 2D and 5, the interlocking feature 20 includes a frusto-conical section 26, an extended annular flange 28 and a cylindrical section 30. These features are preferably defined positively in the second end 18 and negatively in the interior of the spindle hole 14. The negative features are formed from the movement of the aluminum from the interior of the hole 14 as a result of the friction-welding process. These sections of the interlocking feature 20 preferably provide a tight connection between the stem 10 and the knuckle 12 of the spindle after a friction-welding process is completed. The friction-welding process will be described below. After friction-welding, the angle of the frusto-conical section 26 prevents the stem 10 from pulling out of the through hole 14 in the knuckle 12.

Figure 3:
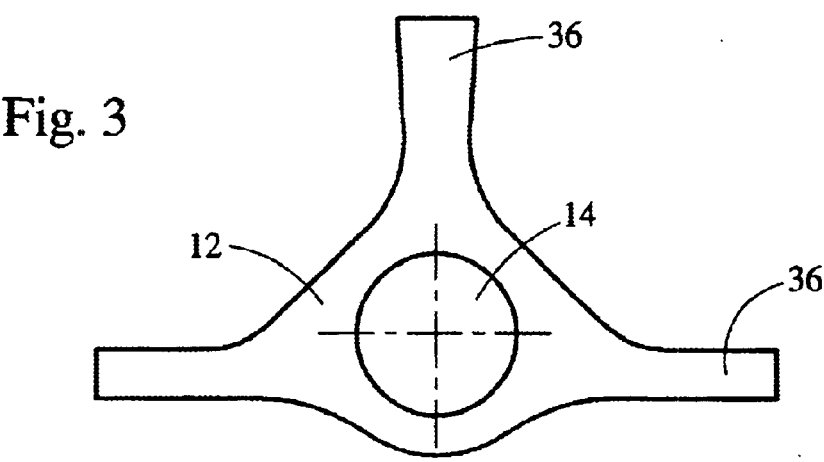
FIG. 3 is a front view of a knuckle for use in the present method.
Figure 4:
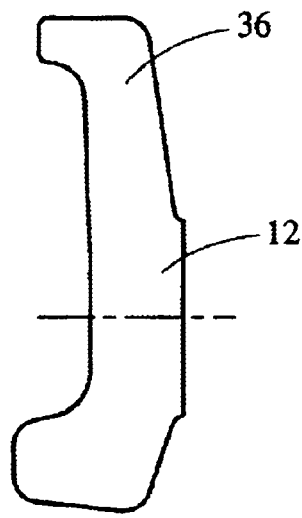
FIG. 4 is a side view of the knuckle of FIG. 3.

In a preferred embodiment of the invention, the frusto-conical section 26 of the interlocking feature 20 has a smaller diameter at its first end 32 than at its second end 34. The first end 32 of the frusto-conical section 26 is preferably adjacent to the extended flange 28. The extended flange 28 is preferably defined substantially in the shape of a right cylinder section sharing the axis 39 with the spindle stem 10. The second end 34 of the frusto-conical section 26 continues into a cylindrical section 30 of the interlocking feature 20. The cylindrical section 30 preferably has an outer diameter smaller than the inner diameter of the through hole 14 defined in the knuckle 12 of the spindle. FIGS. 3 and 4 show views of the knuckle 12 and the through hole 14 of an embodiment of the present invention. The size of the through hole 14 can be adjusted depending on the diameters of the extended flange 28 and the second end 34 of the frusto-conical section 26. The knuckle 12 may also have a plurality of rods 36 extending therefrom. These rods 36 provide an attachment point between the knuckle 12 and the vehicle chassis (not shown) The size and orientation of the rods 36 also can be adjusted depending on vehicle specifications.

Referring in combination to FIGS. 1A, 1B, 1C, 2A, 2B, 2C, and 2D, a preferred method is provided in accordance with the present invention for connecting the stem 10 to the knuckle 12 is shown. The preferred method is a "friction-welding" process that joins the steel stem 10 to the aluminum knuckle 12 without substantially deforming either part. The result is a strong connection between the stem 10 and the knuckle 12, and a spindle construction with high strength and lower weight than prior art spindles constructed entirely of steel. The first step of the preferred method is to provide a stem 10 with an interlocking feature 20 on the second end 18 of the stem 10. As noted above, the interlocking feature 20 of the preferred embodiment includes an extended flange 28 with a diameter greater than the inner diameter of the through hole 14 defined in the knuckle 12. The interlocking feature 20 shown in FIGS. 3 and 4, for example, further includes a frusto-conical section 26 with a smaller diameter than the inner diameter of the through hole 14, and a cylindrical section 30 with a corresponding diameter, also smaller than the inner diameter of the through hole 14. Alternative embodiments of interlocking features are shown in FIGS. 6–9.

In the preferred method, the stem 10 is aligned axially with the hole 14 in the knuckle 12. A rotational force, shown by an arrow 38, is applied to the stem 10 such that the stem 10 rotates around its central axis 39 at up to 5000 RPM, typically via an electric motor. While the stem 10 is rotating, an axial force is applied to the stem 10 in a direction 40 towards the through hole 14 in the knuckle 12. After the stem 10 and the knuckle 12 are connected, a cap 42 may be welded to the portion of the cylindrical section 30 of the interlocking feature 20 that extends out of the through hole 14. This cap 42 provides supplemental reinforcement of the connection between the stem 10 and the knuckle 12.

Figure 1A:
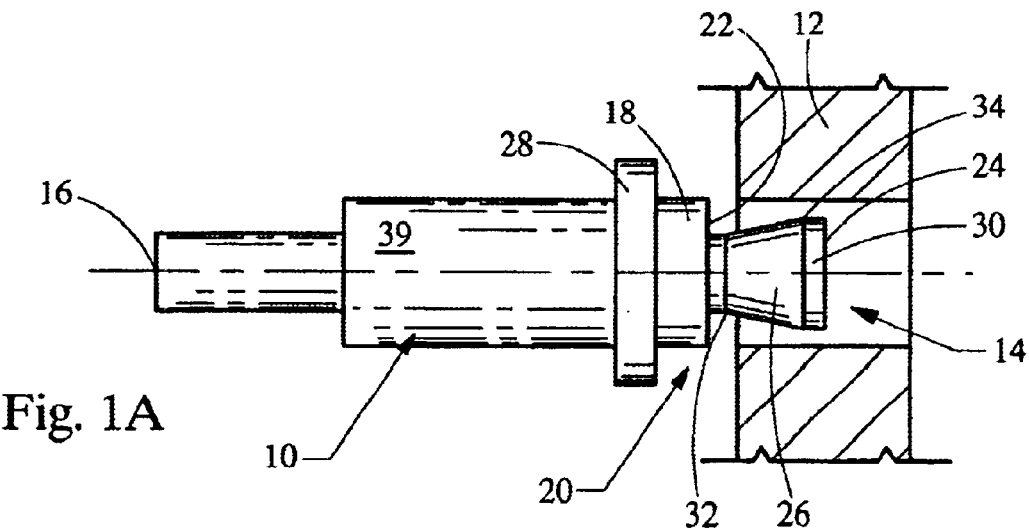
FIGS. 1A, 1B and 1C show a side view of the steps of the method of the present invention for forming an embodiment of the present invention.
Figure 1B:
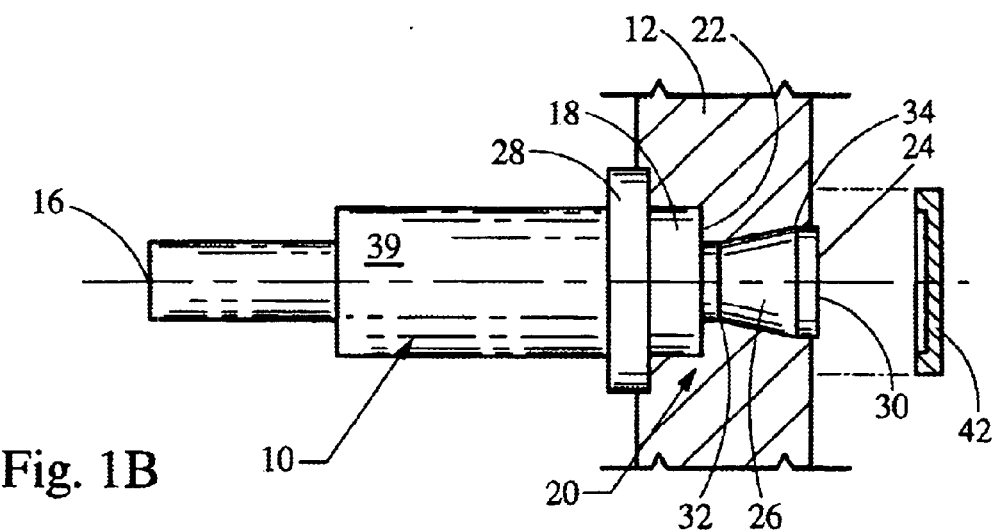
Figure 1C:
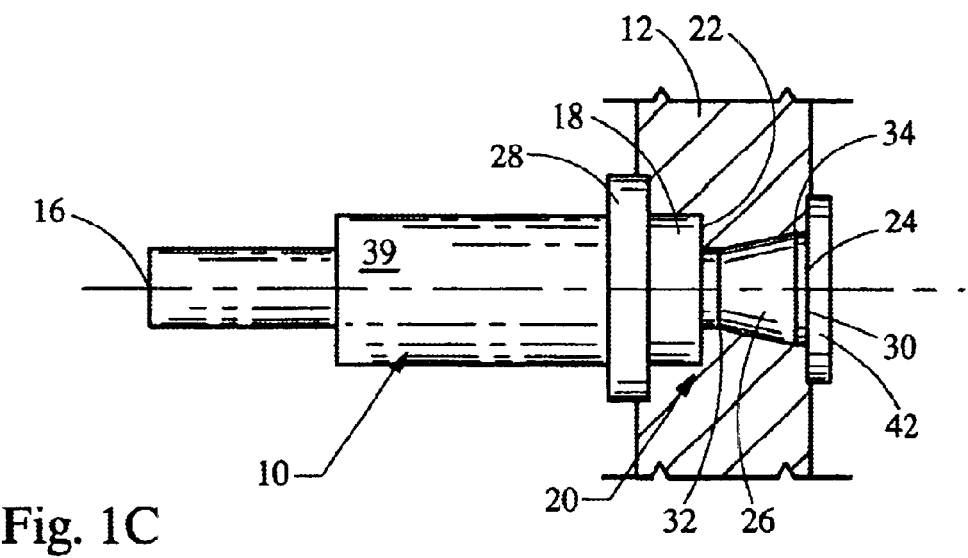
Figure 2A:
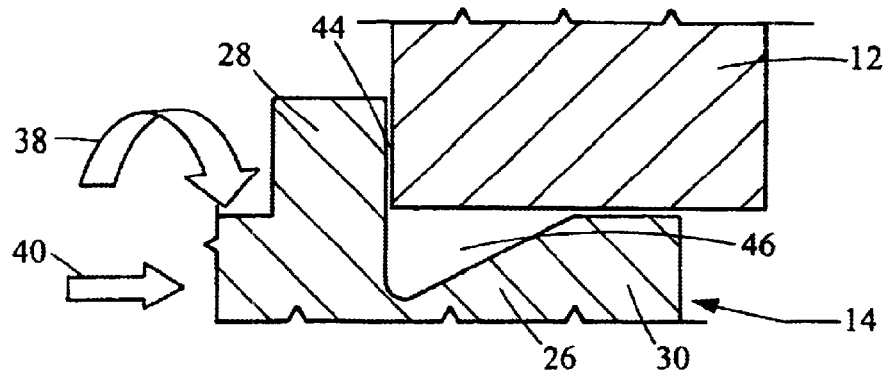
FIGS. 2A, 2B, 2C, and 2D show a close-up view of the steps of an embodiment of the method.
Figure 2B:
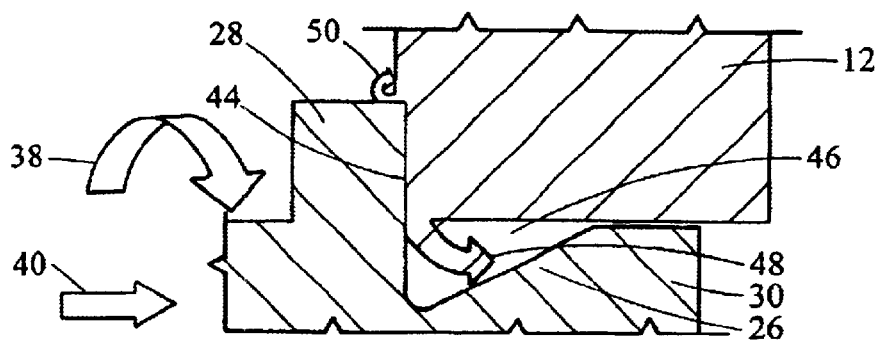
Figure 2C:
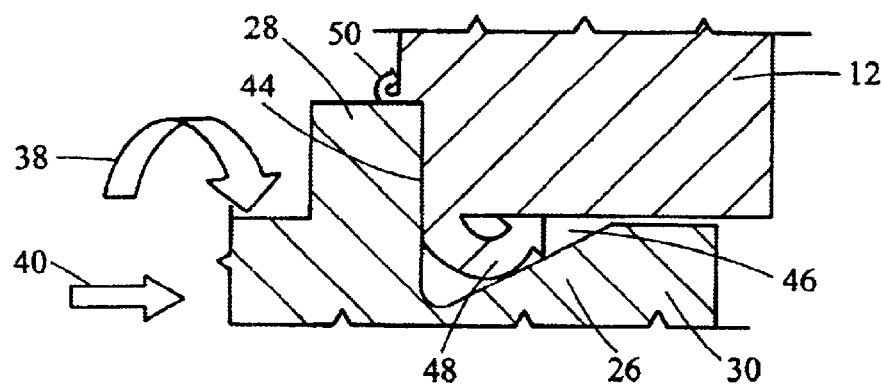
Figure 2D:
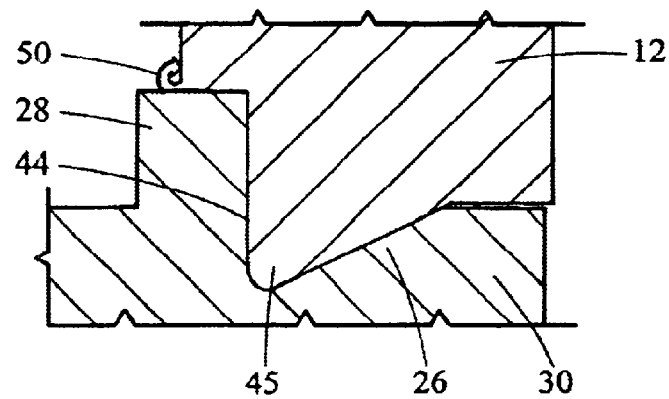

FIGS. 2A, 2B, 2C, and 2D show close up views of the steps of the friction-welding process that results in a tight bond between the stem 10 and the knuckle 12. The axial force causes the frusto-conical section 26 and the cylindrical section 30 of the interlocking feature 20 to enter the through hole 14 of the knuckle 12 without contacting the inner diameter of the knuckle 12. As the axial force continues to be applied to the stem 10, the extended flange 28 of the rotating stem 10 comes into contact with the surface 44 of the knuckle 12. Since the knuckle 12 is formed from aluminum, a soft metal, the harder steel of the stem 10 along with the rotational and axial forces causes the aluminum of the knuckle 12 to soften and begin to move into the space 46 between the frusto-conical section 26 of the interlocking feature 20 and the inner diameter of the through hole 14. An arrow 48 shows the "curling off" of the aluminum of the knuckle 12 into the space 46. FIG. 2D shows the completed spindle after the rotational and axial forces have been removed. A side effect of the friction-welding process is an area of flashing 50 that forms on the surface 44 of the knuckle 12. This flashing 50 can be removed or may remain in place, as it has no effect on the functionality of the spindle. The characteristics of the specific interlocking feature 20 on the stem 10 facilitates the flow of the softened aluminum 45 into the space 46.

Figure 6:
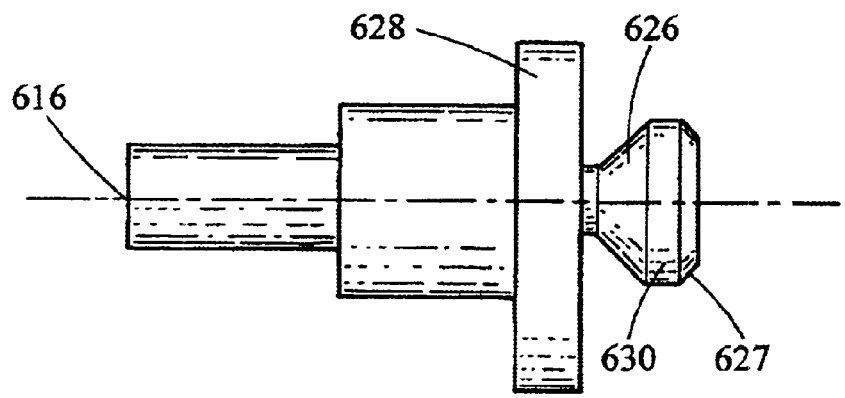
FIG. 6 is a cross-sectional view of an alternate embodiment of a stem for use in the present method.

The preferred method for connecting the stem 10 to the knuckle 12 of the present invention may also be performed using alternative embodiments of the interlocking feature 20 of the stem 10. FIGS. 6–9 show alternative embodiments of the interlocking feature 20. FIG. 6 shows an embodiment of the interlocking feature 620 including a second frusto-conical section 627 after the cylindrical section 630.

Figure 7:
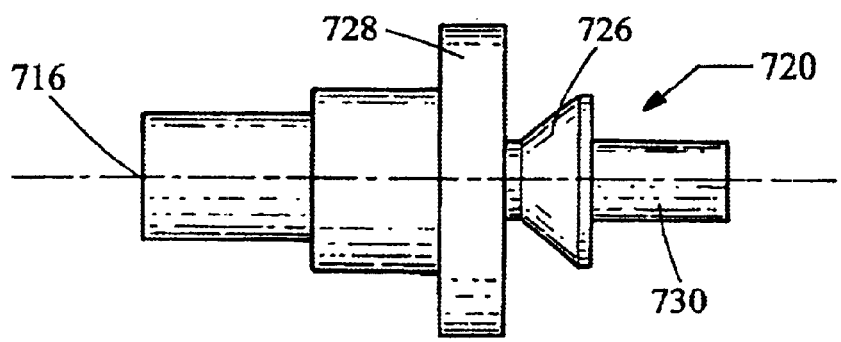
FIG. 7 is a cross-sectional view of an alternate embodiment of a stem for use in the present method.

FIG. 7 shows an embodiment of the interlocking feature 720 including a frusto-conical section 726 as well as a cylindrical section 730 and an extended flange 728. In this embodiment, the cylindrical section 730 has a substantially smaller diameter than the diameter of the second end 734 of the frusto-conical section 730.

Figure 8:
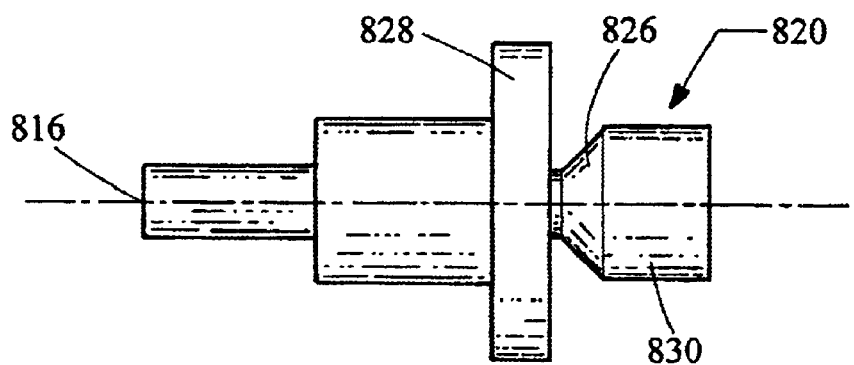
FIG. 8 is a cross-sectional view of an alternate embodiment of a stem for use in the present method.

Another embodiment of the interlocking feature 820 of the present invention is shown in FIG. 8 the embodiment includes an extended flange 828. In this embodiment, the frusto-conical section 826 of the interlocking feature 820 continues directly into the cylindrical section 830 of the interlocking feature 820. The cylindrical section 830 preferably has a diameter smaller than the diameter of the through hole 14 of the knuckle 12.

Figure 9:
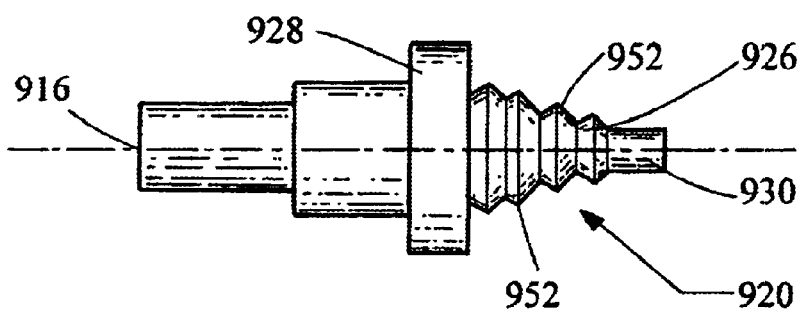
FIG. 9 is a cross-sectional view of an alternate embodiment of a stem for use in the present method.

Yet another embodiment of the interlocking feature 920 for use in the present invention is shown in FIG. 9 the embodiment includes an extended flange 928. In this embodiment, the frusto-conical section 926 has a plurality of angled steps 952 defined on its surface before the cylindrical section 930. These angled steps 952 help maintain a secure connection between the stem 10 and the knuckle 12.

It should be noted that there could be a wide range of changes made to the present invention. For example, the interlocking feature 20 could have different dimensions, as could the aluminum knuckle 12. It is also possible to adjust the rotational speed and axial force applied to the stem 10 depending on the configuration of the interlocking feature 20. The cap 42 on the end of the interlocking feature 20 could be shaped differently, or eliminated entirely. The cap 42 could also be attached in a different manner, such as with an adhesive. Thus, it is intended that the foregoing detailed description be regarded as illustrative rather than limiting and that it be understood that it is the following claims, including all equivalents, which are intended to define the scope of the invention.

What is claimed is:

1. A spindle for use in an automobile chassis comprising:
   an aluminum knuckle;
   an axial through hole defined in the interior of said knuckle; and
   a substantially cylindrical steel stem with an interlocking feature defined on an end of said stem, said interlocking feature having an extended flange with an outer diameter greater than the inner diameter of said through hole, and a frusto-conical section with a first end and a second end, and being adjacent to a cylindrical section of said interlocking feature;

said cylindrical section having a diameter smaller than a diameter of said second end of said frusto-conical section and being adjacent to said second end of said frusto-conical section;

at least a portion of said stem friction welded to at least a portion of said through hole such that said interlocking feature is located within said through hole.

2. The spindle of claim 1, wherein said cylindrical section of said interlocking feature has an outer diameter smaller than said inner diameter of said through hole.

3. The spindle of claim 2, wherein said first end of said frusto-conical section has a smaller diameter than said second end of said frusto-conical section.

4. The spindle of claim 3, wherein said first end of said frusto-conical section is adjacent to said extended flange.

5. The spindle of claim 4, wherein said second end of said frusto-conical section is adjacent to said cylindrical section of said interlocking feature.

6. The spindle of claim 5, wherein said cylindrical section has the same diameter as said second end of said frusto-conical section.

7. The spindle of claim 1, wherein said first end of said frusto-conical section has a larger diameter than said second end and said first end is adjacent to said extended flange.

8. The spindle of claim 7, wherein said frusto-conical section has a plurality of angled steps defined thereon.

9. The spindle of claim 8, wherein a cylindrical section begins at said second end of said frusto-conical section.

10. A spindle for use in an automobile chassis comprising:
an aluminum knuckle having an axial opening defined therein; and
a substantially cylindrical steel stem having an interlocking feature on an end of said stem, said interlocking feature being friction welded into said axial opening of said knuckle;
at least one section of said interlocking feature defines a frusto-conical shape having a plurality of angular steps defined thereon.

11. The spindle of claim 10, wherein said interlocking feature includes an extended annular flange defined thereon.

12. The spindle of claim 11, wherein the narrow end of said frusto-conical shaped section of said interlocking feature is adjacent to said cylindrical stem.

13. The spindle of claim 11, wherein at least one section of said interlocking feature has a cylindrical shape.

14. A spindle for use in an automobile chassis comprising:
an aluminum knuckle;
an axial through hole defined in the interior of said knuckle; and
a substantially cylindrical steel stem with an interlocking feature defined on an end of said stem, said interlocking feature having an extended flange with an outer diameter greater than the inner diameter of said through hole, and a frusto-conical section with a first end and a second end, said first end having a smaller diameter than said second end of said frusto-conical section;
said frusto-conical section being adjacent to a cylindrical section of said interlocking feature, said cylindrical section having the same diameter as said second end of said frusto-conical section;
said first end of said frusto-conical section being adjacent to said extended flange and said second end of said frusto-conical section being adjacent to said cylindrical section of said interlocking feature;
said interlocking feature having an outer diameter smaller than said inner diameter of said through hole; and
at least a portion of said stem welded to at least a portion of said through hole such that said interlocking feature is located within said through hole.

15. A spindle for use in an automobile chassis comprising:
an aluminum knuckle;
an axial through hole defined in the interior of said knuckle; and
a substantially cylindrical steel stem with an interlocking feature defined on an end of said stem, said interlocking feature having an extended flange with an outer diameter greater than the inner diameter of said through hole, and a frusto-conical section with a first end and a second end, said first end having a smaller diameter than said second end of said frusto-conical section;
said frusto-conical section being adjacent to a cylindrical section of said interlocking feature, said cylindrical section having a diameter smaller than said diameter of said second end of said frusto-conical section;
said first end of said frusto-conical section being adjacent to said extended flange and said second end of said frusto-conical section being adjacent to said cylindrical section of said interlocking feature;
said interlocking feature having an outer diameter smaller than said inner diameter of said through hole; and
at least a portion of said stem welded to at least a portion of said through hole such that said interlocking feature is located within said through hole.

16. A spindle for use in an automobile chassis comprising:
an aluminum knuckle;
an axial through hole defined in the interior of said knuckle; and
a substantially cylindrical steel stem with an interlocking feature defined on an end of said stem, said interlocking feature having an extended flange with an outer diameter greater than the inner diameter of said through hole;
a frusto-conical section with a first end and a second end, said first end of said frusto-conical section having a larger diameter than said second end and said first end being adjacent to said extended flange;
said frusto-conical section having a plurality of angled steps defined thereon;
a cylindrical section beginning at said second end of said frustro-conical section; and
at least a portion of said stem welded to at least a portion of said through hole such that said interlocking feature is located within said through hole.

17. A spindle for use in an automobile chassis comprising:
an aluminum knuckle;
an axial through hole defined in the interior of said knuckle; and
a substantially cylindrical steel stem with an interlocking feature defined on an end of said stem, said interlocking feature having an extended flange with an outer diameter greater than the inner diameter of said through hole, and a frusto-conical section with a first end and a second end, said first end of said frusto-conical section being adjacent to said extended flange and having a smaller diameter than said second end of said frusto-conical section;
said frusto-conical section being adjacent to a cylindrical section of said interlocking feature, said cylindrical section having an outer diameter smaller than said inner diameter of said through hole, a diameter smaller than said diameter of said second end of said frusto-conical section, and is adjacent to said second end of said frusto-conical section;

at least a portion of said stem friction welded to at least a portion of said through hole such that said interlocking feature is located within said through hole.

18. The spindle of claim 17, wherein said second end of said frusto-conical section is adjacent to said cylindrical section of said interlocking feature.

19. The spindle of claim 18, wherein said cylindrical section has the same diameter as said second end of said frusto-conical section.

20. A spindle for use in an automobile chassis comprising:

an aluminum knuckle;

an axial through hole defined in the interior of said knuckle; and a substantially cylindrical steel stem with an interlocking feature defined on an end of said stem, said interlocking feature having an extended flange with an outer diameter greater than the inner diameter of said through hole, and a frusto-conical section with a first end and a second end, said first end of said frusto-conical section having a larger diameter than said second end and said first end of said frusto-conical section being adjacent to said extended flange at least a portion of said stem friction welded to at least a portion of said through hole such that said interlocking feature is located within said through hole.

21. The spindle of claim 20, wherein said frusto-conical section has a plurality of angled steps defined thereon.

22. The spindle of claim 21, wherein a cylindrical section begins at said second end of said frusto-conical section.

* * * * *